(12) United States Patent
Fischer

(10) Patent No.: US 11,994,207 B2
(45) Date of Patent: May 28, 2024

(54) METHOD FOR HEATING A GEARBOX

(71) Applicant: ZF Friedrichshafen AG, Friedrichshafen (DE)

(72) Inventor: Harald Fischer, Constance (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 18/252,264

(22) PCT Filed: Oct. 18, 2021

(86) PCT No.: PCT/EP2021/078748
§ 371 (c)(1),
(2) Date: May 9, 2023

(87) PCT Pub. No.: WO2022/106129
PCT Pub. Date: May 27, 2022

(65) Prior Publication Data
US 2023/0407960 A1 Dec. 21, 2023

(30) Foreign Application Priority Data
Nov. 20, 2020 (DE) .................... 10 2020 214 635.7

(51) Int. Cl.
*F16H 61/00* (2006.01)
*F16H 57/04* (2010.01)
(Continued)

(52) U.S. Cl.
CPC ..... *F16H 61/0059* (2013.01); *F16H 57/0413* (2013.01); *F16H 61/0213* (2013.01); *B60W 30/194* (2013.01); *F16H 2061/0232* (2013.01)

(58) Field of Classification Search
CPC ............. F16H 61/0059; F16H 57/0413; F16H 61/0213; F16H 2061/0232; B60W 30/194
See application file for complete search history.

(56) References Cited

U.S. PATENT DOCUMENTS 7,267,633 B2 * 9/2007 Hitch ................... F02D 41/083
192/3.24
7,771,311 B2 * 8/2010 Graham ............. B60W 30/194
477/98

(Continued)

FOREIGN PATENT DOCUMENTS

JP H03292444 A 12/1991

OTHER PUBLICATIONS

European Patent Office, International Search Report issued in International patent application No. PCT/EP2021/078748 (dated Jan. 20, 2022).

(Continued)

*Primary Examiner* — Sherry L Estremsky
(74) *Attorney, Agent, or Firm* — Finch & Maloney PLLC

(57) ABSTRACT

A method for heating a transmission (3) with a torque converter (11), is disclosed. By the selective actuation of clutches (K1, K2, K3, KR, KV) various gears (R1, R2, R3, V1, V2, V3) can be engaged, so that the transmission (3) is blocked on the drive output side, whereby a turbine shaft (12) of the torque converter (11) is immobilized while a drive power is introduced into the transmission (3) by a drive element (2) Blocking the transmission is brought about by actuating the clutches (K1, K2, K3, KR, KV) in such manner that two gears (R1, R2, R3, V1, V2, V3) different from one another in the same driving direction are engaged at the same time.

8 Claims, 4 Drawing Sheets

(51) Int. Cl.
*F16H 61/02* (2006.01)
*B60W 30/194* (2012.01)

(56) References Cited

U.S. PATENT DOCUMENTS

| | | | | |
|---|---|---|---|---|
| 8,410,401 | B2* | 4/2013 | Thomas | B60L 1/12 |
| | | | | 219/205 |
| 8,858,393 | B2* | 10/2014 | Nogle | B60W 10/115 |
| | | | | 477/110 |
| 9,366,336 | B2* | 6/2016 | Gooden | F16H 61/0006 |
| 10,012,311 | B2* | 7/2018 | Whitmarsh | F16H 61/0267 |
| 11,041,534 | B2* | 6/2021 | Cicala | F16H 61/0059 |
| 2009/0152070 | A1* | 6/2009 | Nakamura | F16H 61/0059 |
| | | | | 192/219.4 |
| 2013/0079195 | A1 | 3/2013 | Nogle | |
| 2015/0217733 | A1 | 8/2015 | Ries et al. | |
| 2016/0084371 | A1 | 3/2016 | Gooden et al. | |
| 2020/0224761 | A1 | 7/2020 | Larsson | |

OTHER PUBLICATIONS

European Patent Office, Written Opinion issued in International patent application No. PCT/EP2021/078748 (dated Jan. 20, 2022).
German Patent Office, Office Action issued in German patent application No. 10 2020 214 635.7 (dated Jul. 23, 2021).

* cited by examiner

METHOD FOR HEATING A GEARBOX

RELATED APPLICATIONS

This application claims the benefit under 35 U.S.C. § 371 as a U.S. National Phase application of application no. PCT/EP2021/078748, filed on 18 Oct. 2021, which claims benefit of German Patent Application no. 10 2020 214 635.7 filed 20 Nov. 2020, the contents of which are hereby incorporated herein by reference in their entireties.

BACKGROUND

The present invention relates to a method for heating a transmission and the transmission oil it contains. The transmission can for example be in the form of an automatic/powershiftable transmission, a dual-clutch transmission, an automated manual transmission (for example of countershaft design) or a (hydrostatic mechanical) power-branched transmission (CVT). Predominantly the method is intended for transmissions in working machines, but it can also be used for transmissions in other vehicles.

At lower temperatures the shifting comfort and efficiency of a transmission can be substantially reduced owing to the viscosity of the transmission oil. Furthermore, it is made more difficult to deliver sufficient transmission oil to places where lubrication oil is needed, such as bearings, shifting elements, and gearwheels. A non-homogeneous temperature distribution is also disadvantageous in relation to the wear and useful life of components.

To counteract this, it is known to implement a warming function for heating a transmission, in particular after a cold start. Thus, for example, US 2016/0084371 A1 discloses a warming function for an automatic transmission and the oil it contains, in connection with a method for checking the fluid level. In this method the engine rotation speed is increased and a turbine shaft on the drive output side of a torque converter of the transmission is rotationally fixed relative to the transmission housing by closing a clutch and a brake.

SUMMARY

The purpose of the present invention can be regarded as to provide an improved method for heating a transmission and the transmission oil it contains.

This objective is achieved by the method according to the invention. In this, clutches of a transmission with a torque converter are actuated selectively in order to engage different gears. An engaged gear is understood to mean that a gear ratio is set between the transmission input and the transmission output. In the context of the method, the transmission is blocked on the output side. This means that a turbine shaft of the torque converter is held motionless while by means of a drive element a drive power is introduced into the transmission. Thereby, in the torque converter a power loss in the form of heat is generated. The drive element can be in the form of an internal combustion engine or an electric machine. Hybrid designs are also conceivable, in which a drive power is produced by an internal combustion engine and/or an electric machine. According to the invention, the transmission is blocked in that two gears of the same travel direction, different from one another, are engaged at the same time. Depending on the design of the transmission, it can comprise several forward and reverse gears. Accordingly, the method can be implemented just as well by engaging different forward or different reversing gears.

In a first step of the method, in order engage two gears different from one another the associated clutches are actuated. In this the clutches may be in the form of interlocking or frictional shifting elements. In particular, the said clutches are actuated hydraulically or (electro-)mechanically. In the case of hydraulic actuation, the clutches are acted upon by pressure to actuate them, whereby they are closed and can transmit a torque or rotation movement. For example, the first and second gears can be engaged. Optionally to the output-side, blocking by means of clutches, in addition a service and/or parking brake of the vehicle and/or a parking lock of the transmission, can also be actuated. However, owing to the blocking by engaging two different gears a larger input torque can be supported, so that a higher drive power is introduced, larger power loss is produced and consequently a larger heat input can be generated. The result is quicker and more efficient heating of the transmission. Typically, the clutches are controlled by a transmission control unit, so that the method can also be carried out by the said control unit.

In a second step a driving direction clutch is actuated. Typically, the transmission comprises two driving direction clutches, one for driving forward and one for reversing. In that way the same number of forward and reverse gears can be obtained. After the clutches have been actuated in the manner described above, in a third step a rotation speed of the drive element is increased, in particular from an idling rotation speed to a heating rotation speed.

After the set speed has been maintained for a defined time, in a fourth step it is reduced again before, in a fifth step, the previously closed driving direction clutch is opened. The duration of the driving element's rotation speed elevation can be a predetermined fixed period, or individually chosen as a function of other parameters. In particular, the duration of the rotation speed elevation has to be limited so as to avoid overheating. In a sixth step, a rinsing process is initiated, by means of which the opened clutches are rinsed through and a transmission oil circulation is produced. Among other things this results in a homogeneous heat distribution.

At the end of the process the temperature can be measured directly or indirectly by a sensor, by which means it is checked whether a defined target temperature has been reached or even exceeded. Then the heating process is ended. If the target temperature has not been reached, steps two to six are repeated. Here, the sequence of steps two to six constitutes a cycle.

In a further development the cycle duration can be varied, in particular made shorter as the number of cycles increases. The cycle duration can also be set as a function of the temperature determined. The duration could also be made shorter as the temperature increases. However, a fixed cycle time can be specified and a number of cycles can also be set as a function of a temperature at the beginning of the process.

When the target temperature is reached at the end of the cycle in progress, in a seventh step the driving direction clutch concerned is also opened and this terminates the method.

Advantageously, for the output-side blocking of the transmission two adjacent gears are engaged at the same time. For example, these could be the first and second gears, but any other combination is also conceivable. The engagement of adjacent gears has the advantage that in this way torques of similar size can be supported or transmitted. The farther apart are the gears engaged (for example the first and third gears), the larger will be an imbalance of the torque that can be supported.

Optionally, monitoring of a drive output rotation speed is provided. This serves to ensure that during the process of heating the transmission, the vehicle is not moving in a manner that is not permissible. Accordingly, there must be no rotation speed on the drive output side. As soon as an (impermissible) rotation speed is detected, the process is interrupted and the transmission is changed to a safer condition. For this, either the driving direction clutch actuated and/or all the clutches are opened.

The process can be started either by a manual input by an operator, or automatically. In particular for an automated initiation of the method environmental and/or transmission parameters (temperature) can be taken into account. When a vehicle is being started it can also be provided that the operator is notified that he should initiate the process.

According to a further aspect of the present invention, the vehicle must comprise a drive element and a transmission with clutches and a torque converter. In addition, the transmission comprises a control device, for example a transmission control unit. The control device is suitable and designed for carrying out the method according to the invention. The control device can be made separately, or it can be integrated in an engine control unit or a superordinated control unit.

BRIEF DESCRIPTION OF THE DRAWINGS

The present invention will now be explained in greater detail with reference to the figures below, which show.

DETAILED DESCRIPTION

Figure 1:
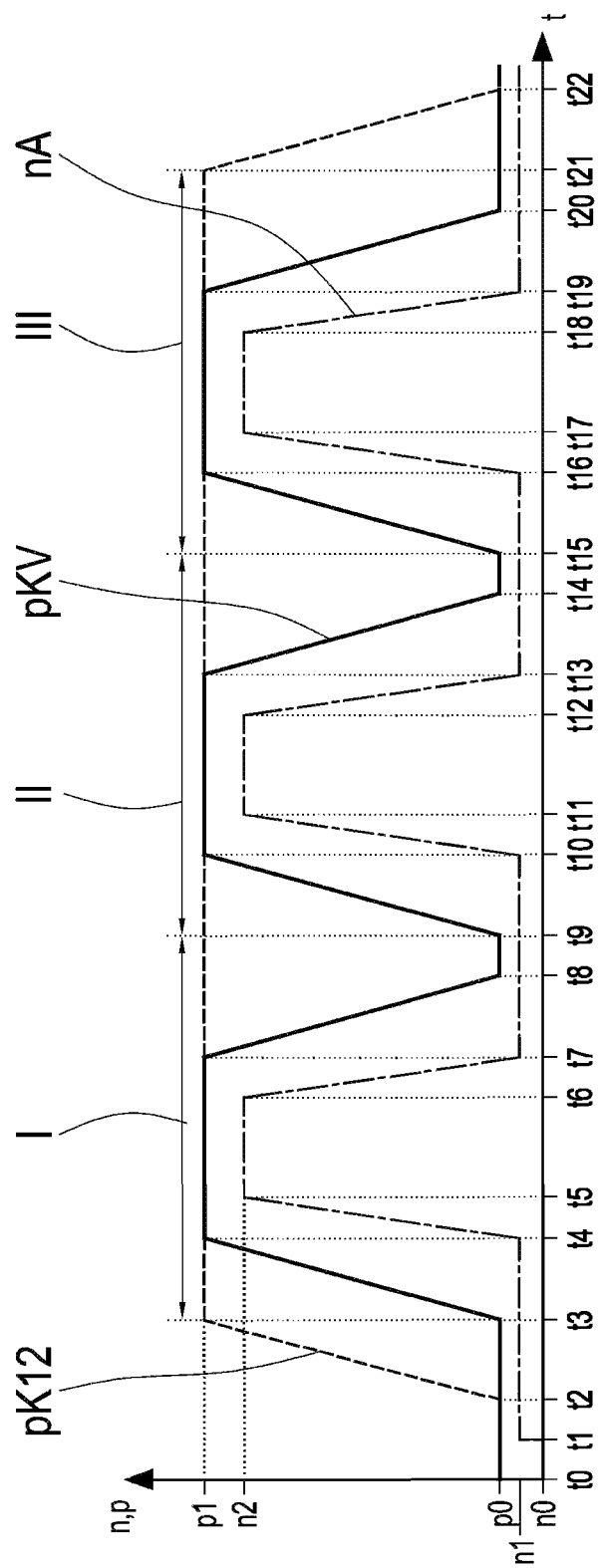
FIG. 1: A diagram of the time variation during the implementation of the method.

FIG. 1 shows, in a very simplified manner and not drawn to scale, a diagram illustrating a time variation of the method according to the invention for heating a transmission 3. In the diagram the time t is plotted along the abscissa, whereas a rotation speed n and a pressure p are plotted on the ordinate. Furthermore, the variation of the pressure pK12 is represented by broken lines, this corresponding to the actuation pressure of a first and a second clutch K1, K2. These are acted upon simultaneously and with the same pressure pK12. The variation of the rotation speed nA of a drive element 2 is represented by dot-dash lines. The detail of the variation of the pressure pKV is shown by a continuous line, this corresponding to the actuation pressure of the forward (driving) direction clutch KV. In the version of the method illustrated here a reversing (driving direction) clutch KR remains in a non-actuated condition, although this could just as well have been actuated instead of the forward clutch KV for implementing the method. According to the concept of the invention, the transmission 3 is blocked on the drive output side by actuating the clutches K1, K2, K3 in such manner that in a torque converter 11 the drive power introduced gives rise to a calculated power loss in the form of heat, which heats the transmission 3.

At a point in time t0 the drive element 2 is in a deactivated condition, so that the rotation speed nA adopts the value n0. At time t1 the drive element 2 is started, whereupon (abruptly) the rotation speed reaches n1. This corresponds for example to the idling speed of the drive element 2, if the latter is in the form of an internal combustion engine. Until time t2 the pressures pKV and pK12 have the value p0. Consequently, the first and second clutches K1, K2 and the clutch KV are not pressurized.

At time point t2 the first and second clutches K1, K2 are acted upon by pressure, the pressure increase taking place with a first gradient. At time t3 the pressure pK12 reaches the value p1, which corresponds to full closure of the clutches K1, K2. Thus, a maximum torque can be transmitted. When the value p1 is reached by the pressure pK12, the clutch KV is acted upon by pressure. Consequently, the pressure pKV increases. Between reaching the value p1 by the pressure pK12 and the beginning of the pressure increase in relation to the pressure pKV, a time offset (not shown here) can also be provided, so that this does not take place exactly at the same point in time t3. The pressurization during this takes place with a second gradient, such that this can be different from or identical to the first gradient. At time t4 the pressure pKV also reaches the value p1. At the same time or optionally with a time offset (not shown here), the rotation speed nA increases from the value n1 to the value n2 at time t5. This takes place with a third gradient, which typically differs from the first and second gradients. Until time t6 the rotation speed nA remains at the value n2 and then falls during an interval between times t6 and t7 down to the value n1 again. This can take place with the negative third gradient, or any other gradient. At time t7 the pressure pKV is then reduced until, at time t8 it has again adopted the value p0. This can take place with the second gradient or with any other gradient. Optionally, here too a time offset can be provided. Until time t9 the rotation speed nA remains at the value n1 and the pressure at the value p0. During this interval a rinsing process takes place in order to distribute the heated transmission oil in the transmission 3 and lubricate the clutches K3, KV and KR.

The interval between t3 and t9 describes a first cycle I for heating the transmission 3. If the target temperature for the transmission 3 or the transmission oil in it has not yet been reached, the first cycle I is followed by an identical second cycle II and, if necessary, a third cycle III. In that case the pressure pKV increases at time t9 until time t10 as already in the first cycle I, and at time t10 the rotation speed nA increases until time t11. In the interval between times t12 and t13 the rotation speed nA decreases and in the interval from time t13 to time t14 the pressure pKV falls again to the value p0. This is followed by a rinsing process at time t15.

The third cycle III corresponds in its sequence to the first and second cycles I and II. At time t15 the pressure pKV increases and at time t16 so does the rotation speed nA. Until time t18 the rotation speed nA and the pressure pKV remain unchanged, whereas in the interval from t18 to t19 the rotation speed nA first falls again to the value n1 before, in the interval from t19 to t20, the pressure pKV again falls to the value p0. At the conclusion of the rinsing process at time t21 the third cycle III ends.

In the example illustrated here, at the end of the third cycle III the target temperature has been reached. Since there is no need to carry out a further cycle I, II, III, in the interval from t21 to t22 the pressure pK12 falls to the value p0. the pressure pK12 has in fact remained constant at the value p1 from time t3 to time t21. At time t22 the process has been completed. The vehicle 1 can then be operated normally.

For example, for the first and second gradients a slope of 0.8 bar/s can be provided, so that after around 20 seconds a nominal pressure of p1=16 bar is reached. Furthermore, as rotation speed values for example n1=800 rpm and n2=1, 500 rpm can be provided.

In a further development not illustrated here, it can further be provided that the pressurization of the clutch KV does not take place until time-point t3, i.e., when the value p1 for the pressure pK12 has been reached, but already at an earlier time. In particular this could take place after half of the interval between times t2 and t3. This is because already at that time the first and second clutches K1, K2 are already acted upon by a pressure which is sufficient to counteract the torque transmitted by the clutch KV.

If the vehicle 1 is made with an electric machine as its drive element 2, the rotation speed n1 can also be identical to the rotation speed n0. In other words, no idling rotation speed has to be approached or maintained. In other respects, the method is then carried out in the same way, with that adaptation.

Figure 2:
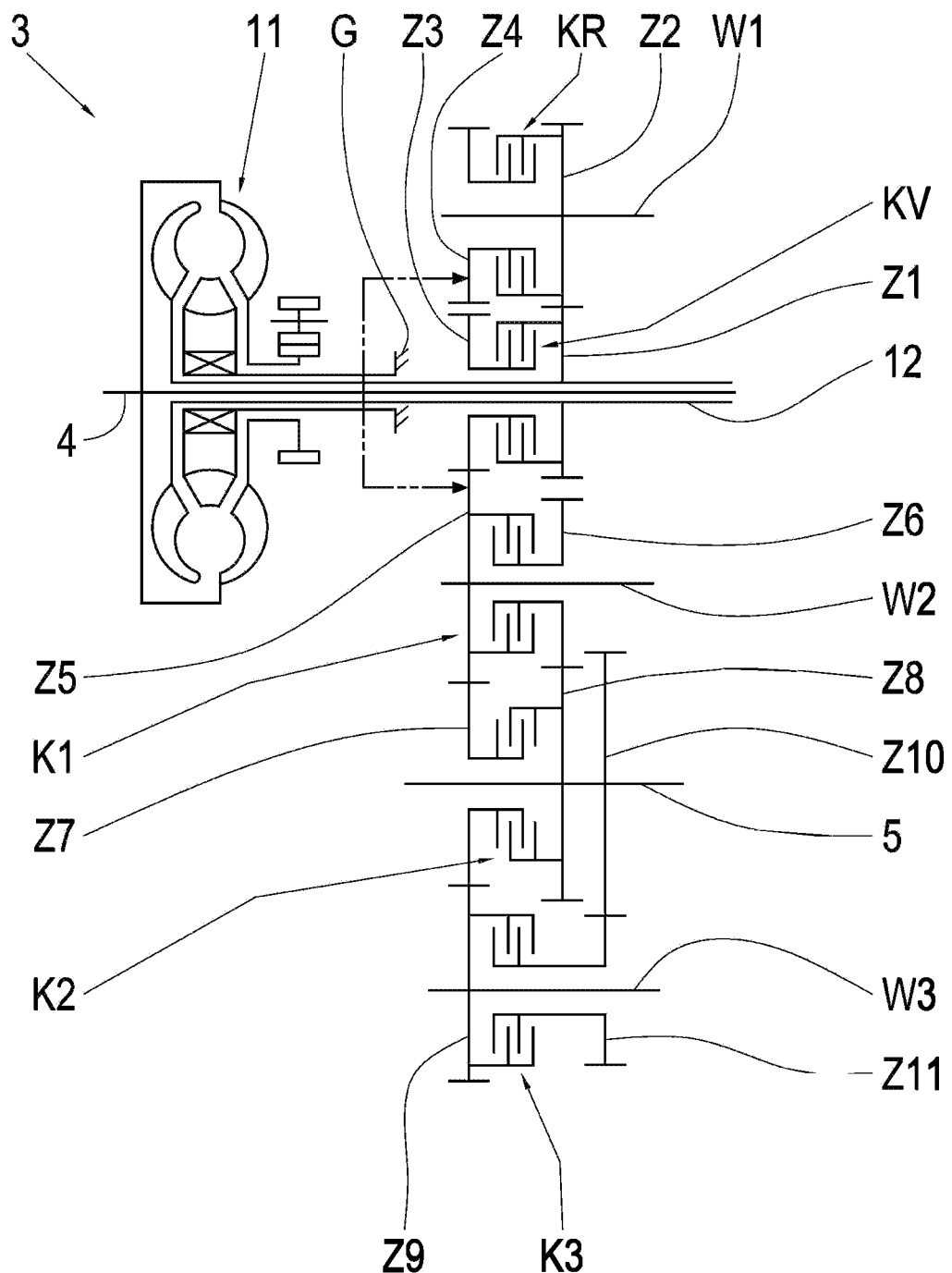
FIG. 2: A schematic representation of a transmission.

FIG. 2 shows a schematic illustration of a transmission 3. A torque is introduced by way of a driveshaft 4 from the drive unit 2 (not shown). In the present case the transmission 3 comprises a torque converter 11 which is supported on a housing G and with a turbine shaft 12 introduces the rotation movement into the transmission 3 for gearing up or down. A gearwheel Z1 is rotationally fixed to the turbine shaft 12. The gearwheel Z1 meshes with a gearwheel Z2 which is mounted rotationally fixed on a shaft W1. The gearwheel Z2 can be connected by means of the clutch KR to a gearwheel Z4 which is arranged and can rotate on the shaft W1. The gearwheel Z4 meshes with a gearwheel Z5 as indicated by the arrow shown by broken lines. The gearwheel Z5 is arranged rotationally fixed on a shaft W2. In addition, on the turbine shaft 12 there is arranged rotatably a gearwheel Z3, which also meshes with the gearwheel Z5. By means of the clutch KV the gearwheel Z3 can be connected to the gearwheel Z1. In other words, a rotation movement is transmitted to the gearwheel Z5 either when the clutch KR or when the clutch KV is actuated.

Likewise on the shaft W2 but rotatably compared to the gearwheel Z5, a gearwheel Z6 is arranged. This can be connected to the gearwheel Z5 by the clutch K1. On a drive output shaft 5 there are arranged a rotatable gearwheel Z7 and rotationally fixed gearwheels Z8 and Z10. By means of the clutch K2 the gearwheel Z7 and the gearwheel Z8 can be connected to one another. The gearwheel Z7 meshes with the gearwheel Z5, whereas the gearwheel Z8 meshes with the gearwheel Z6.

The gearwheel Z7 also meshes with a gearwheel Z9 which is arranged rotationally fixed on a shaft W3. In addition, on the shaft W3 there is arranged rotatably a gearwheel Z11 which meshes with the gearwheel Z10. By means of the clutch K3 the gearwheel Z11 and the gearwheel Z9 can be connected to one another.

The gearwheels Z1 to Z11 are typically in the form of straight- or helically-toothed spur gears. A rotationally fixed connection is understood to mean that the gearwheels Z1, Z2, Z5, Z8, Z9, and Z10 concerned are in the form of fixed wheels and therefore they rotate with the same rotation speed and in the same rotation direction as the associated shafts 12, 5, W1, W2, W3. A rotatable arrangement, in contrast, is understood to mean that the gearwheels concerned are in the form of loose wheels so that a relative movement between the loose wheels and the associated shafts 12, 5, W1, W2, W3 is possible. In other words, loose wheels and the associated shafts 12, 5, W1, W2, W3 can rotate freely relatively to one another. By actuating a clutch K1, K2, K3, KV, KR a rotationally fixed connection of the loose wheels to a shaft 12, 5, W1, W2, W3 or to a fixed wheel can be made.

Figure 3:
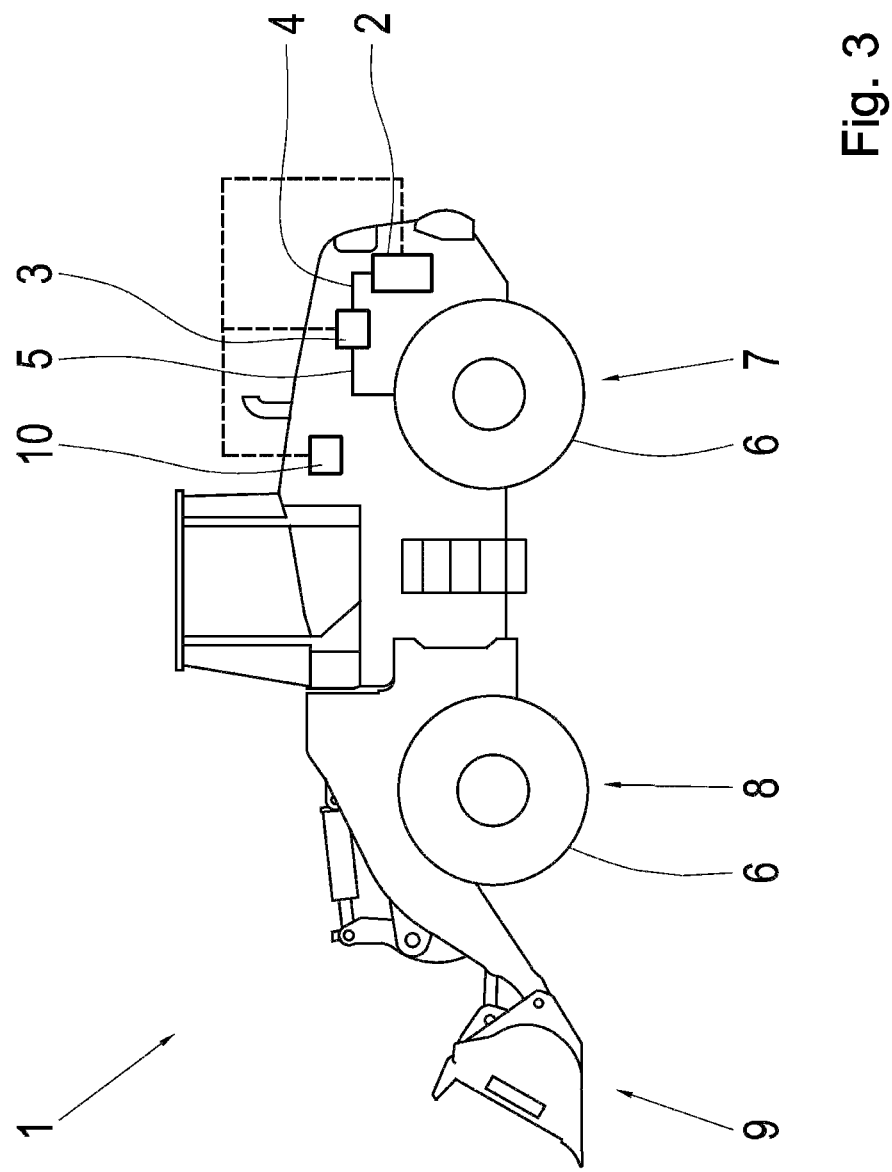
FIG. 3: An embodiment of a vehicle with a control device for implementing the method.

FIG. 3 shows in a very simplified representation an embodiment of a vehicle 1 in which the method according to the invention is implemented. In this case the vehicle 1 is in the form of a working machine, in particular a wheel loader. The application of the method according to the invention is not restricted to wheel loaders or working machines, but rather, the embodiment in this case will be described in greater detail purely as an example.

The vehicle 1 has a drive element 2 and a transmission 3. The drive element 2 and the transmission 3 are functionally connected to one another by way of a driveshaft 4. In other words, a rotation movement or torque from the drive element 2 is introduced into the transmission 3 by way of the driveshaft 4. In accordance with the particular gear ratio set, the torque or rotation movement from the drive element 2 is stepped up or down and transmitted via the drive output shaft 5 to a vehicle axle 7, 8. In this case one or more vehicle axles 7, 8 can be driven. In addition, the vehicle 1 has an attachment 9, in this case a lifting frame with a scoop.

In the embodiment illustrated here, the vehicle 1 has a separate control device 10, which is connected for the exchange of signals with the drive element 2 and the transmission 3. In FIG. 3 the signal-transmitting connection is represented by broken lines. Alternatively, the control device 10 can be integrated in the transmission 3 or in the drive element 2, for example, in a transmission control unit or a motor control unit. In the control device 10 the method according to the invention is carried out and corresponding signals for controlling the drive element 2 and the transmission 3 are generated and emitted. In the same way signals, for example about an actuation condition or device-specific parameters from the drive element 2 and/or the transmission 3 can be sent to the control device 10 and processed by it.

Figures 4, 5:
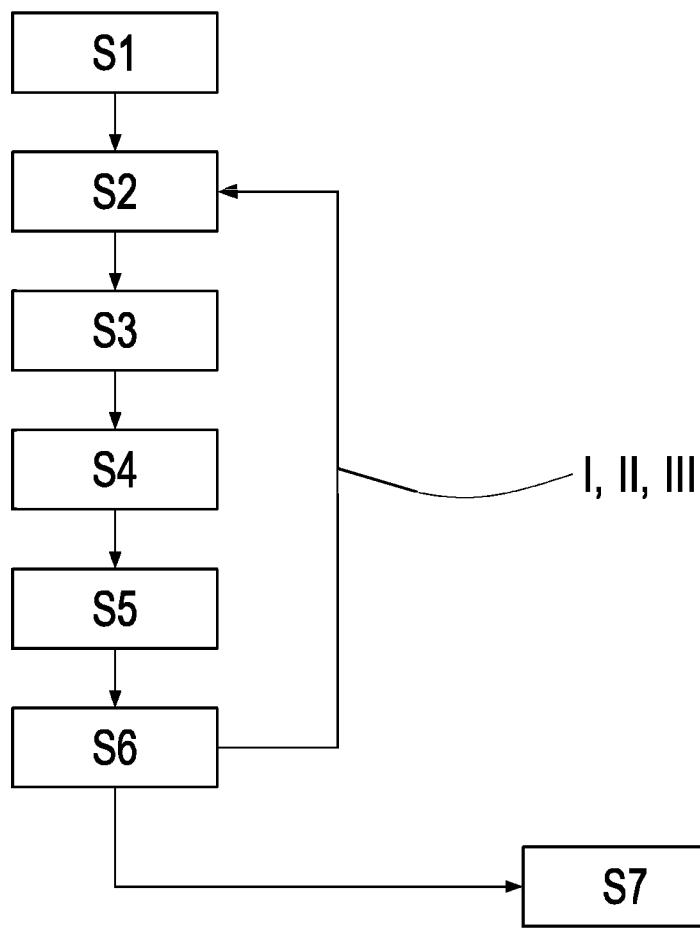
FIG. 4: A shifting matrix for actuating the transmission shown in FIG. 2.
FIG. 5: A schematic representation of the steps of the method.

FIG. 4 shows a shifting matrix for actuating the transmission 3. In this, an actuated clutch KV, KR, K1, K2, K3 is indicated by an X. By alternative actuation of the clutches KV, KR, K1, K2, K3 a total of six gears V1, V2, V3, R1, R2, R3 can be obtained. These are divided respectively into three forward gears V1, V2, V3 and three reverse gears R1, R2, R3. To engage the first forward gear V1 the forward (driving direction) clutch KV and the first clutch K1 are in an actuated condition. By actuating the forward (driving direction) clutch KV and the second clutch K2 the second forward gear is engaged. With the forward (driving direction) clutch KV and the third clutch K3 actuated, the third forward gear is obtained.

In a similar manner the reversing gears R1, R2, R3 can be produced and for this, analogously to the forward gears V1, V2, V3, the reversing (driving direction) clutch KR is actuated together with the clutch K1, K2, K3 concerned. The result is that to obtain a gear V1, V2, V3, R1, R2, R3 in each case a (driving direction) clutch KV, KR and a (gear) clutch K1, K2, K3 have to be actuated at the same time.

FIG. 5 shows a schematic representation of the steps S1, S2, S3, S4, S5, S6, S7 of the method according to the invention. Here, in a first step S1 the clutches K1, K2, K3 for engaging two gears R1, R2, R3, V1, V2, V3 different from one another are actuated. In a second step S2 a clutch KR, KV for a driving direction is actuated, for example the clutch KV. In a third step S3 the rotation speed nA of the drive element 2 is increased until it is reduced again in a fourth step S4. In a fifth step S5 the driving direction clutch KR, KV which was actuated in the second step S2 is opened and then, in a sixth step S6, a rinsing process is initiated. The second to sixth steps S2, S3, S4, S5, S6 constitute a cycle I, II, III in the sense of the disclosures relating to FIG. 1. The steps S2 to S6 are repeated cyclically until a target temperature of the transmission (3) has been reached. When the target temperature is reached at the end of the cycle I, II, III concerned, in a seventh step S7 the clutches K1, K2, K3 actuated in step S1 are opened. When step S7 has been carried out, the process has been completed. The vehicle 1 can then be operated normally.

INDEXES

1 Vehicle
2 Drive element
3 Transmission
4 Driveshaft
Drive output shaft
6 Wheel
7, 8 Vehicle axle
9 Attachment
Control device
11 Torque converter
G Housing
I, II, III (Heating) cycles
KR, KV (Driving direction) clutch
K1, K2, K3 (Gear) clutch
n. n0, n1, n2 Rotation speed
nA Rotation speed of the drive element
p, p0, p1 Pressure
pK12 Pressure for actuating K1, K2
pKV Pressure for actuating KV
R1, R2, R3 (Reversing) gear
S1 to S7 (Process) steps
t0 to t22 Time point
V1, V2, V3 (Forward) gear
W1 to W3 Shaft
Z1 to Z11 Gearwheel

The invention claimed is:

1. A method for heating a transmission with a torque converter, wherein by the selective actuation of clutches various gears can be engaged, the method comprising:
blocking the transmission on a drive output side by immobilizing a turbine shaft of the torque converter while delivering a drive power by a drive element to the transmission, wherein blocking the transmission comprises:
actuating clutches to engage two gears different from one another;
actuating a clutch defining a driving direction; and
increasing a rotation speed of the drive element;
wherein blocking the transmission is performed by actuating the clutches in such manner that two gears different from one another but in the same driving direction are engaged at the same time.

2. The method according to claim 1 wherein blocking the transmission further comprises:
reducing the rotation speed;
opening the clutch defining the driving direction; and
initiating a rinsing process.

3. The method according to claim 2, comprising repeating cyclically the steps of (i) actuating the clutch defining the driving direction, (ii) increasing the rotation speed of the drive element, (iii) reducing the rotation speed, (iv) opening the clutch defining the driving direction, and (v) initiating the rinsing process, until a target temperature of the transmission is reached.

4. The method according to claim 3, comprising, in response to reaching the target temperature, opening the clutches which were actuated to engage two gears different from one another.

5. The method according to claim 1, wherein blocking the transmission includes engaging two adjacent gears at the same time.

6. The method according to claim 1, comprising:
monitoring a drive output rotation speed;
detecting an unacceptable rotation speed value at a drive output shaft;
changing a condition of the transmission; and
interrupting heating the transmission.

7. The method according to claim 1, comprising initiating heating the transmission by a manual input and/or automatically.

8. A vehicle comprising:
a drive element;
a transmission with clutches; and
a control device, configured to carry out the method according to claim 1.

* * * * *